US012705270B2

(12) United States Patent
Choi

(10) Patent No.: US 12,705,270 B2
(45) Date of Patent: Aug. 11, 2026

(54) METHOD FOR VISUALIZING PATENT DOCUMENTS THROUGH SIMILARITY ASSESSMENT BASED ON NATURAL LANGUAGE PROCESSING AND DEVICE FOR PROVIDING THE SAME

(71) Applicant: TANALYSIS CO., LTD., Seoul (KR)

(72) Inventor: Inkyung Choi, Seoul (KR)

(73) Assignee: TANALYSIS CO., LTD., Seoul (KR)

( * ) Notice: Subject to any disclaimer, the term of this patent is extended or adjusted under 35 U.S.C. 154(b) by 0 days.

(21) Appl. No.: 18/853,645

(22) PCT Filed: Apr. 5, 2023

(86) PCT No.: PCT/KR2023/004592
§ 371 (c)(1),
(2) Date: Oct. 2, 2024

(87) PCT Pub. No.: WO2023/195768
PCT Pub. Date: Oct. 12, 2023

(65) Prior Publication Data

US 2025/0231980 A1 Jul. 17, 2025

(30) Foreign Application Priority Data

Apr. 5, 2022 (KR) ........................ 10-2022-0042194
Apr. 5, 2022 (KR) ........................ 10-2022-0042213
May 6, 2022 (KR) ........................ 10-2022-0056067

(51) Int. Cl.
*G06F 16/338* (2019.01)
*G06F 16/34* (2025.01)
*G06F 16/358* (2025.01)

(52) U.S. Cl.
CPC .......... *G06F 16/338* (2019.01); *G06F 16/345* (2019.01); *G06F 16/358* (2019.01); *G06F 2216/11* (2013.01)

(58) Field of Classification Search
CPC .... G06F 16/338; G06F 16/345; G06F 16/358; G06F 2216/11
(Continued)

(56) References Cited

U.S. PATENT DOCUMENTS 6,370,533 B1 * 4/2002 Sato ....................... G06Q 10/10 707/999.01
7,840,893 B2 * 11/2010 Kulas .................... G06F 16/951 715/234
(Continued)

FOREIGN PATENT DOCUMENTS

JP 2004-110271 A 4/2004
JP 2021-86592 A 6/2021
(Continued)

OTHER PUBLICATIONS

CSC, User's Manual for the Examiners Automated Search Tool (EAST) 2.0, retrieved from U.S. Appl. No. 15/891,254 docket, Nov. 3, 2003, 253 pages. (Year: 2003).*
(Continued)

*Primary Examiner* — Phong H Nguyen
(74) *Attorney, Agent, or Firm* — WHDA, LLP

(57) ABSTRACT

The present disclosure relates to a method and device for providing patent document information based on natural language processing of patent documents. A method for visualizing patent documents implemented by a computer according to the present disclosure includes: receiving information about a target patent; and allowing a user interface to be displayed, wherein the user interface includes a first panel for classifying cores defining at least one component information extracted from the input target patent according to determined colors, and a second panel for classifying similarity assessment results of the target patent with respect to similar patents according to the determined colors. According to the present disclosure, by providing, in the form of a
(Continued)

GUI, an interface for inputting patent information to be analyzed, users can easily request analysis of patent documents.

20 Claims, 18 Drawing Sheets

(58) Field of Classification Search
USPC ................ 707/706, 722, 741, 749, 805, 924
See application file for complete search history.

(56) References Cited

U.S. PATENT DOCUMENTS

| | | | | |
|---|---|---|---|---|
| 2008/0288489 | A1* | 11/2008 | Kim | G06F 16/334 707/999.006 |
| 2012/0284199 | A1* | 11/2012 | Lundberg | G06Q 10/00 705/310 |
| 2015/0074005 | A1* | 3/2015 | Brougher | G06Q 10/10 705/311 |
| 2018/0189909 | A1* | 7/2018 | Zellner | G06F 16/93 |
| 2018/0232428 | A1* | 8/2018 | Fleming | G06F 16/26 |
| 2019/0079979 | A1* | 3/2019 | Chan | G06Q 50/18 |
| 2020/0349204 | A1* | 11/2020 | Shirasaka | G06F 40/205 |
| 2020/0356595 | A1 | 11/2020 | Kim et al. | |
| 2021/0011935 | A1* | 1/2021 | Walsh | G06F 16/3347 |
| 2021/0358570 | A1* | 11/2021 | Kumar | G06F 16/383 |

FOREIGN PATENT DOCUMENTS

| | | | |
|---|---|---|---|
| KR | 10-2014-0111238 | A | 9/2014 |
| KR | 10-2018-0072167 | A | 6/2018 |
| KR | 10-2046925 | B1 | 12/2019 |
| KR | 10-2020-0017575 | A | 2/2020 |
| KR | 10-2085217 | B1 | 3/2020 |
| KR | 10-2020-0122151 | A | 10/2020 |
| KR | 10-2021-0039916 | A | 4/2021 |
| KR | 10-2021-0053539 | A | 5/2021 |
| KR | 10-2021-0100389 | A | 8/2021 |

OTHER PUBLICATIONS

Request for the Submission of an Opinion dated Jan. 25, 2023, issued in counterpart Korean Application No. 10-2022-0056067 (17 pages).

Prior art research reports dated May 18, 2022, issued in counterpart Korean Application No. 10-2022-0056067 (16 pages).

International Search Report dated Aug. 25, 2023, issued in counterpart International Application No. PCT/KR2023/004592 (4 pages).

* cited by examiner

Similarity

DB

Query information

Similar patent document information

Figure 9:
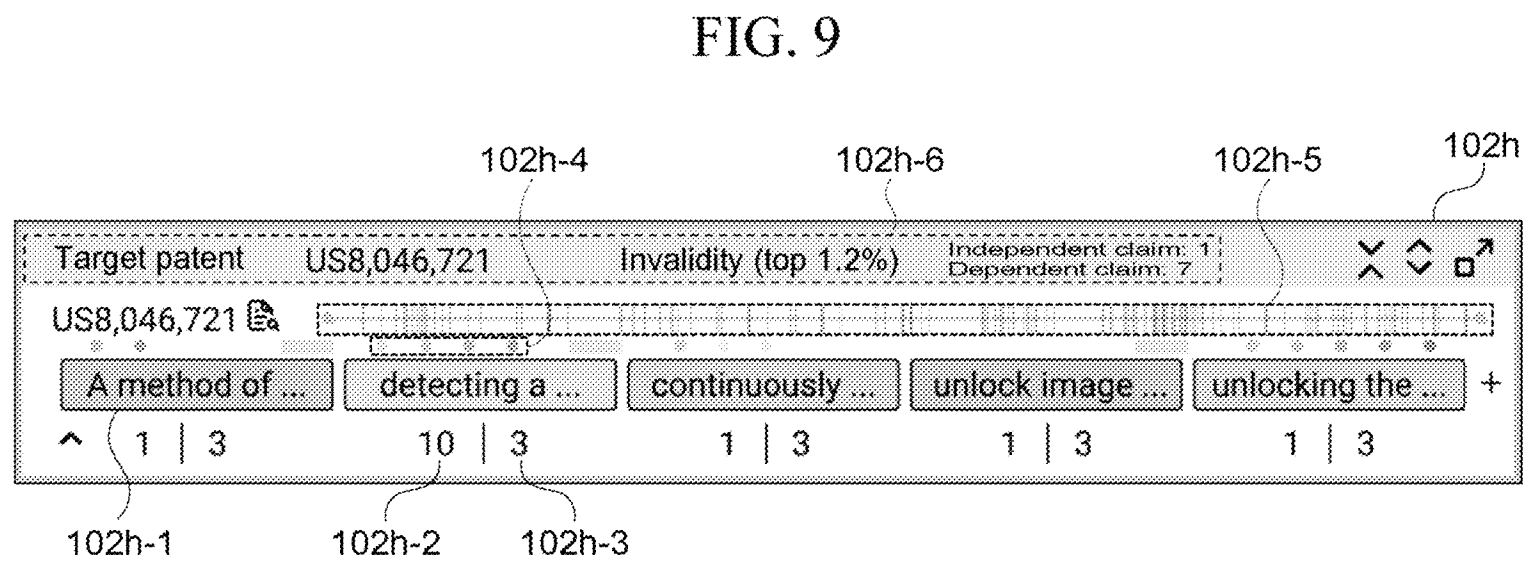

102h
102h-5
102h-6
102h-4
Target patent
US8,046,721
Invalidity (top 1.2%)
Independent claim: 1
Dependent claim: 7
US8,046,721
A method of ...
1 | 3
detecting a ...
10 | 3
continuously ...
1 | 3
unlock image ...
1 | 3
unlocking the ...
1 | 3
102h-1
102h-2
102h-3

Validity for each core

| | Grade | Top % | Frequency | Average similarity | Core contents |
|---|---|---|---|---|---|
| Core 1 | F | 89 | 12,351 | 87 | A method of unlocking a hand-held electronic device, the device including a touch-sensitive display |
| Core 2 | C | 64 | 7,253 | 85 | detecting a contact with the touch-sensitive display at a first predefined location corresponding to ... |
| Core 3 | C | 53 | 4,253 | 84 | wherein the unlock image is a graphical, interactive user-interface object with which a user interacts in order to unlock the device |
| Core 4 | B | 37 | 437 | 83 | unlocking the hand-held electronic device |
| Core 5 | B | 28 | 234 | 78 | if the moving the unlock image on the touch-sensitive display results in movement of the unlock image from the first predefined location to a predefined unlock region on the touch-sensitive display |

100
102
102c
102p
102h,102i
102p-1
102j
Core contents
Map panel
Technology A
Technology B
Technology C
Technology D
Technology E
Technology F

METHOD FOR VISUALIZING PATENT DOCUMENTS THROUGH SIMILARITY ASSESSMENT BASED ON NATURAL LANGUAGE PROCESSING AND DEVICE FOR PROVIDING THE SAME

TECHNICAL FIELD

The present disclosure relates to a method and device for providing patent document information based on natural language processing of patent documents.

BACKGROUND ART

The importance of intellectual property is increasing with the 4th industrial revolution, and companies are actively investing in R&D to develop various business channels.

As products of the R&D, companies are trying to protect their technologies by establishing technological barriers through domestic and international patents. At the same time, companies are trying to secure business areas through patent litigation or secure business stability through patent avoidance design.

Due to the characteristics of the 4th industrial revolution where convergence technologies are developing, disputes between overlapping technologies are increasing day by day, and the cost of patent litigation is also increasing to a high level that exceeds the operating profit of the company, so the value of patents is gradually increasing.

Nevertheless, the current utilization of patents, which require expertise, is low compared to the high costs of R&D investment, and the scale of economic loss due to bad patents that are not actually utilized in the industry is approximately 2 trillion won annually in South Korea and about 28 trillion won annually in the United States.

Recently, artificial intelligence technologies that have been rapidly developing are providing various analysis algorithms for the field of natural language processing (NLP), and various natural language processing methods capable of analyzing documents with structure and non-structure based on embedding are being designed (Korean Patent Publication No. 10-2342055 (Dec. 17, 2021)).

Accordingly, a method that can provide patent document information to users through more specialized analysis may be required for patent documents with characteristic structures according to formal requirements and conventional expressions.

DISCLOSURE

Technical Problem

The present disclosure provides a method for providing patent analysis results through a neural network model that has trained patent data and patent determination data from a patent office or court.

In addition, the present disclosure provides an interface that inputs user's condition setting for patent analysis and outputs analysis results accordingly.

In addition, the present disclosure provides a method for visualizing a patent analysis result and providing the patent analysis result to a user.

Technical Solution

In one general aspect, a method implemented by a computer includes: receiving target patent information; and displaying a user interface that includes a first panel which distinguishes cores defining at least one component information extracted from the input target patent according to a determined color, and a second panel which distinguishes similarity assessment results of the target patent with respect to similar patents according to the determined color.

The first panel may include extraction criteria for each core for extracting the similar patents.

The first panel may include weights of the similarity assessment with the similar patents.

The second panel may include results according to the extraction criteria for each core for extracting the similar patents.

The interface may further include a third panel that provides corresponding paragraph information for each core of the target patent or the similar patents.

The interface may further include a third panel that provides a validity determination result according to a comparison for each core of the similar patents extracted from the target patent.

The third panel may provide a statistical validity score of the target patent.

The third panel may provide a distribution location of a validity score of a patent whose validity has been determined in the past or a validity score of a patent whose validity has been determined to be invalid, based on the validity score of the target patent.

The interface may include a fourth panel that maps feature vectors of the target patent or the similar patents into a feature space and provides the feature vectors.

A first feature vector of the target patent and a second feature vector of the similar patents may have a distance in the feature space corresponding to a similarity calculated for the target patent and the similar patents.

In one general aspect, a method implemented by a computer includes: displaying first and second cores of a target patent; displaying a first similar document similar to the target patent; and displaying 1-1th core mapping information and 1-2th core mapping information of the first similar document, in which the 1-1th core mapping information is information generated based on a 1-1th text similar to the first core among texts of the first similar document, and the 1-2th core mapping information is generated based on a 1-2th text similar to the second core among the texts of the first similar document.

The 1-1th text may have a similarity to the first core among the texts of the first similar document that is greater than or equal to a first threshold value.

The 1-2th text may have a similarity to the second core among the texts of the first similar document that is greater than or equal to a second threshold value smaller than the first threshold value.

The first and second cores may be extracted from claims of the target patent.

The method may further include: displaying a third core of the target patent; and displaying 1-3th core mapping information of the first similar document, in which the 1-3th core mapping information is information generated based on a 1-3th text similar to the third core among the texts of the first similar document.

The 1-1th core mapping information may be displayed at a first position corresponding to the first core, and the 1-2th core mapping information may be displayed at a second position corresponding to the second core.

The first and second cores and the 1-1th and 1-2th core mapping information may be arranged in a matrix form, the first and second cores may be arranged in a first row, and the 1-1th and 1-2th core mapping information may be arranged in a second row.

The first text may be provided in plurality, and the 1-1th core mapping information may include at least one of the number of the plurality of first texts, an average similarity of the 1-1th texts to the first core, and a similarity of the 1-1th text most similar to the first core among the plurality of 1-1th texts.

A color of the 1-1th core mapping information may be determined based on at least one of the number of the plurality of first texts, the average similarity of the 1-1th texts to the first core, and a maximum similarity of the 1-1th text most similar to the first core among the plurality of 1-1th texts.

The method may further include: setting a filter threshold value of any one of the number, the average similarity, and the maximum similarity; and displaying the 1-1th core information mapping only when a value corresponding to the filter threshold value among the 1-1th core mapping information is greater than or equal to the filter threshold value.

Positions of each of the 1-1th and 1-2th texts on the first similar document may be displayed on a horizontal line.

The method may further include: displaying a second similar document similar to the target patent; and displaying 2-1th core mapping information and 2-2th core mapping information of the second similar document, in which the 2-1th core mapping information is information generated based on a 2-1th text similar to the second core among texts of the second similar document, and the 2-2th core mapping information is information generated based on a 2-2th text similar to the second core among the texts of the second similar document.

The method may further include: displaying first core mapping statistics based on the 1-1th core mapping information and the 2-1th core mapping information; and displaying second core mapping statistics based on the 1-2th core mapping information and the 2-2th core mapping information.

In another general aspect, a method implemented by a computer includes: displaying a target document; and displaying a similarity grade of a similar document similar to the target document, in which the similarity grade is determined based on a target similarity, which is a similarity between the target document and the similar document, and a grade criterion, the grade criterion including a first reference value, and the first reference value is a first average similarity which is an average similarity between applications or patents lacking novelty and cited references for novelty of the applications or patents.

The target similarity and the first average similarity may be calculated by the same algorithm or neural network model.

The grade criterion may further include a second reference value, and the second reference value may be a second average similarity, which is an average similarity between applications or patents lacking inventive step and cited references for inventive step of the applications or patents, and the second average similarity may be smaller than the first average similarity.

The grade criterion may include at least one of third, fourth, and fifth reference values.

The third reference value may be a third average similarity, which is an average similarity between applications and IDS documents submitted at the time of filing of the applications, and the third average similarity may be smaller than the second average similarity, the fourth reference value may be a fourth average similarity, which is an average similarity between documents excluding the cited references for novelty, the cited references for the inventive step, and the IDS documents among documents within the technical field of the target document and the target document, and the fourth average similarity may be smaller than the second average similarity, and the fifth reference value may be a fifth average similarity, which is an average similarity between documents excluding the technical field of the target document and the target document, and the fifth average similarity may be smaller than the second average similarity.

In still another general aspect, a method implemented by a computer includes: displaying a target document; displaying at least one of similar documents similar to the target document; and displaying a validity grade of the target document, in which the validity grade is determined based on a target validity score and a grade criterion of the target document, the grade criterion includes a first reference value, and the target validity score is determined based on the target document and the similar documents, and the first reference value is a first average validity score which is an average validity score of a rejected application or an invalidated patent.

The target validity score and the first average validity score may be calculated by the same algorithm or neural network model.

The target validity score may be determined based on a similarity score between the target document and the similar documents.

The grade criterion may further include a second reference value, and the second reference value may be a second average validity score which is an average validity score of applications that have never been rejected or patents that have never been invalidated, and the second average validity score may be higher than the first average validity score.

The first average validity score may be an average validity score of applications lacking novelty.

The grade criterion may further include a second reference value, and the second reference value may be a second average validity score, which is an average validity score of applications or patents lacking inventive step, and the second reference value may be smaller than the first reference value.

Advantageous Effects

According to the present disclosure, by providing, in the form of a GUI, an interface for inputting patent information to be analyzed, it is possible for users to easily request analysis of patent documents.

In addition, by inputting analysis conditions of patent information to be analyzed based on a graphical user interface, it is possible for users to intuitively request results that meet their needs.

According to the present disclosure, by providing analysis results visualized according to input user conditions, it is possible to easily and quickly understand the analysis results.

In addition, according to the present disclosure, by providing the analysis results using the trained neural network model, it is possible to faster provide the analysis results.

BRIEF DESCRIPTION OF THE DRAWINGS

FIG. 1 is a conceptual diagram illustrating a patent document analysis service according to an embodiment of the present disclosure.

FIGS. 7 to 16 are exemplary diagrams illustrating an interface configuration according to an embodiment of the present disclosure.

BEST MODE

Figure 2:
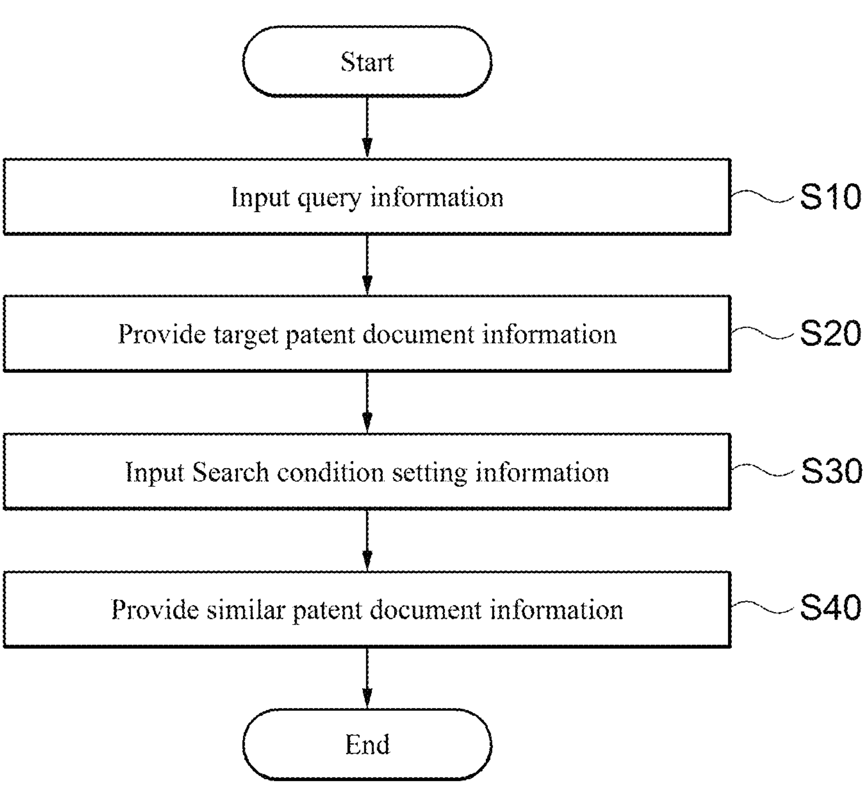
FIG. 2 is a flowchart illustrating a method for providing patent document analysis results according to an embodiment of the present disclosure.

The following description exemplifies only a principle of the disclosure. Therefore, those skilled in the art may invent various apparatuses implementing the principle of the disclosure and included in the spirit and scope of the disclosure although not explicitly described or illustrated herein. In addition, it is to be understood that all conditional terms and embodiments mentioned herein are obviously intended only to allow those skilled in the art to understand a concept of the disclosure in principle, and the disclosure is not limited to embodiments and states particularly mentioned as such.

The objects, features, and advantages described above will become more obvious from the following detailed description provided in relation to the accompanying drawings, and accordingly, those skilled in the art to which the disclosure pertains may easily practice the technical spirit of the disclosure.

Further, in describing the present disclosure, in the case in which it is judged that a detailed description of a well-known technology associated with the present disclosure may unnecessarily make the gist of the present disclosure unclear, it will be omitted. Hereinafter, an embodiment of the disclosure will be described in detail with reference to the accompanying drawings.

Figure 1:
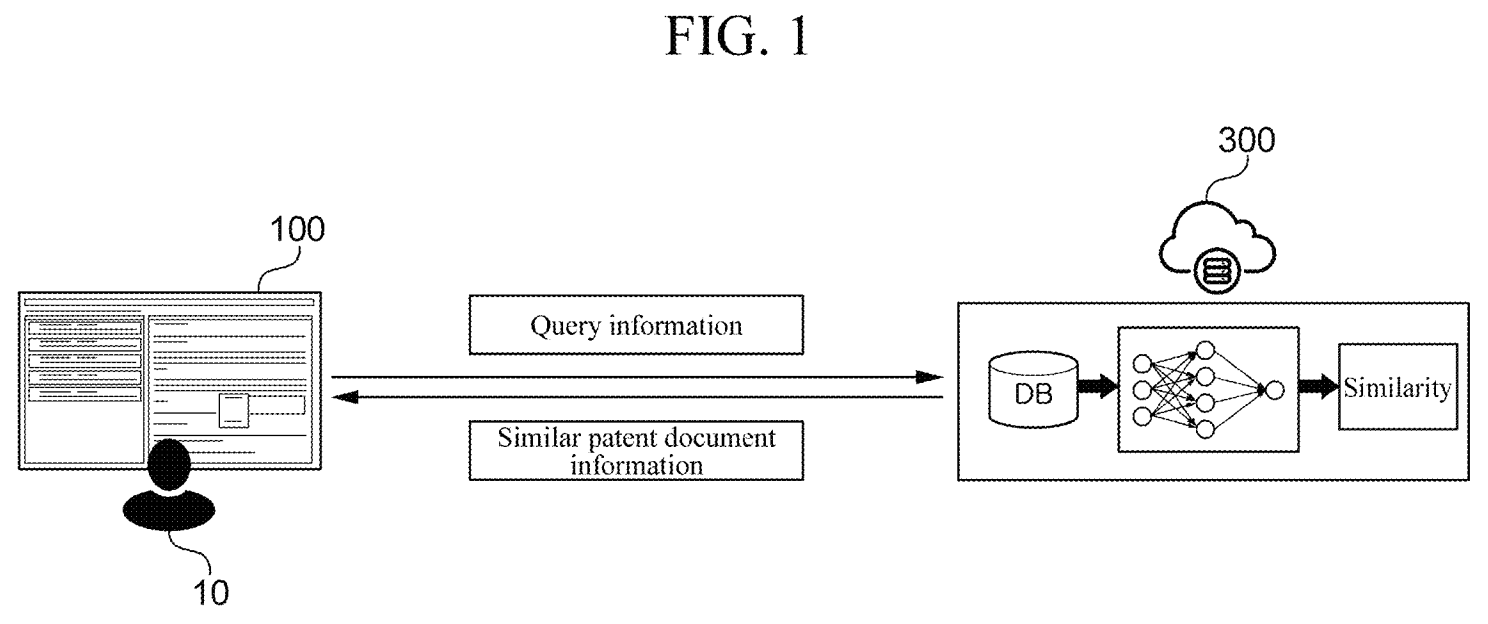

FIG. 1 is a diagram illustrating a patent document analysis service system that provides similarity assessment results between patent documents according to an embodiment of the present disclosure.

Referring to FIG. 1, the system according to the present embodiment may include a user 10 who inputs query information including target information of patent document to be analyzed through a user terminal 100 and a server 300 that extracts and provides similar patent document information corresponding to the query information input by the user 10.

In the present embodiment, the server 300 may provide an interface for inputting the user's query information to a graphical user interface (GUI) through a display device of the user terminal 100, and the user may input the query information by utilizing various interface elements provided to the GUI.

For example, the user 10 may input the target information of patent document as the query information through a text input interface, and set information on a core structure of a target patent and a threshold appearance count (frequency), a threshold similarity, or weights thereof as additional search conditions.

The server 300 may extract information of documents from a database (DB) that manages patent documents through the input query information and determine a similarity to prior patents using a trained neural network model, thereby generating similar patent document information.

In the present embodiment, the neural network model may extract an embedding vector corresponding to a patent document from a database that manages embedding vectors pre-extracted for the patent documents and input the extracted embedding vector to a pre-trained similarity model, thereby calculating a similarity score.

Alternatively, the neural network model according to the present embodiment can be implemented in a dual structure with an embedding model and a similarity assessment model that calculates a similarity through an output of the embedding model, directly including the embedding model that extracts meanings inherent in text of the patent documents based on natural language processing. Therefore, the neural network model can compare the core component information selected by the user for the target patent document with prior patent documents in real time to calculate the similarity.

In addition, the present embodiment exemplifies a method for extracting and displaying similar prior patent documents based on query information. However, The prior patent documents are interpreted as prior document in a broad sense and may include papers or technical data published in academic societies or archives (arxiv) as non-patent documents, and various text documents published on web communities such as GitHub. Accordingly, the collected various technical data may be used as a single prior art document by using the publication date or time as a unit and managed in a database described below, and thus, used to extract documents similar to the query patent document.

The server 300 provides the similar patent document information determined for the query information of the user 10 through the above process to the user terminal 100.

The provided similar patent document information is also provided to the user 10 through the GUI, so the user 10 may intuitively check the patentability, etc., of the target patent in comparison with the similar patent document.

Hereinafter, a method for visualizing similarity determination results of a patent document according to the present embodiment will be described with reference to FIG. 2.

First, referring to FIG. 2, the user 10 may input query information for searching for a similar patent document through the GUI provided as a display device of the user terminal 100 (S10).

The query information may include, as an identification value of a target patent document that becomes a criterion for extracting similar patent documents, information for identifying a patent, such as an application (or publication or registration) number of a patent or a title of invention.

The server 300 may extract a target patent document corresponding to the input query information from a DB and provide target patent document information to the user terminal 100 for setting search conditions (S20).

Steps S20 and S30 are optional steps, and at least one of the two steps may be omitted.

Figure 3:
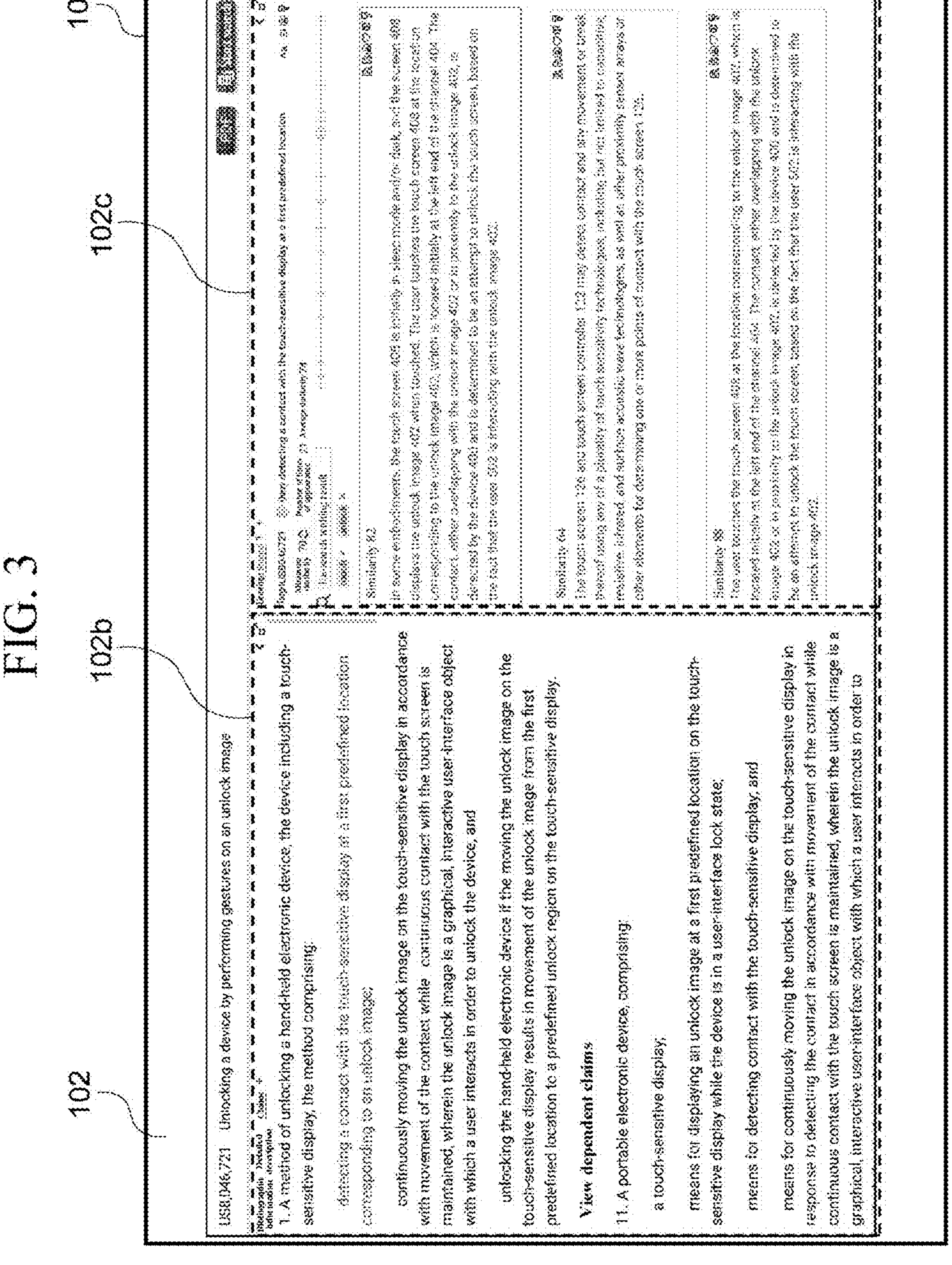
FIGS. 3 and 4 are exemplary diagrams illustrating an interface configuration for receiving a patent document analysis request according to an embodiment of the present disclosure.

Referring to FIG. 3, when a user inputs U.S. Pat. No. 8,046,721 as query information, the server 300 may extract the corresponding target patent document from the DB and provide contents as a GUI 102 on the display of the user terminal 100.

In this case, the provided GUI 102 may be divided into at least two panels, and in the case of a first panel 102*b*, claims of the target patent document are provided so that the user 10 may select components in the claims. Alternatively, in the case of the first panel 102*b*, a detailed description of the target patent document is provided so that the user 10 may select components in the detailed description.

In order to determine the possibility of invalidity or registration of the target patent for the purpose of analyzing the patent document, it is necessary to search and extract similar prior patent documents based on the claims, and therefore, in the present embodiment, the claims of the target patent document may be provided through the first panel 102*b* to be set as keywords for search.

A second panel 102*c* may be adjacent to the first panel 102*b* and extract and provide contents of specification text of the target patent document corresponding to components in a claim selected by the user. In this case, the contents of the specification text provided may be provided by being distinguished based on paragraphs containing similar sentences to the components in the claim, and the selected components and similarity assessment results for each paragraph may be provided together.

Alternatively, the second panel 102*c* may extract and provide contents of specification text of the target patent document corresponding to components in a detailed description selected by the user adjacent to the first panel 102*b*. In this case, the contents of the specification text provided may be distinguished and provided based on paragraphs containing similar sentences to the components in the detailed description, and the selected components and similarity assessment results for each paragraph may be provided together.

The user sets the search conditions by referring to the components in the claim or detailed description of the first panel and the description paragraphs containing the detailed description of the components as the second panel (S30).

Figure 4:
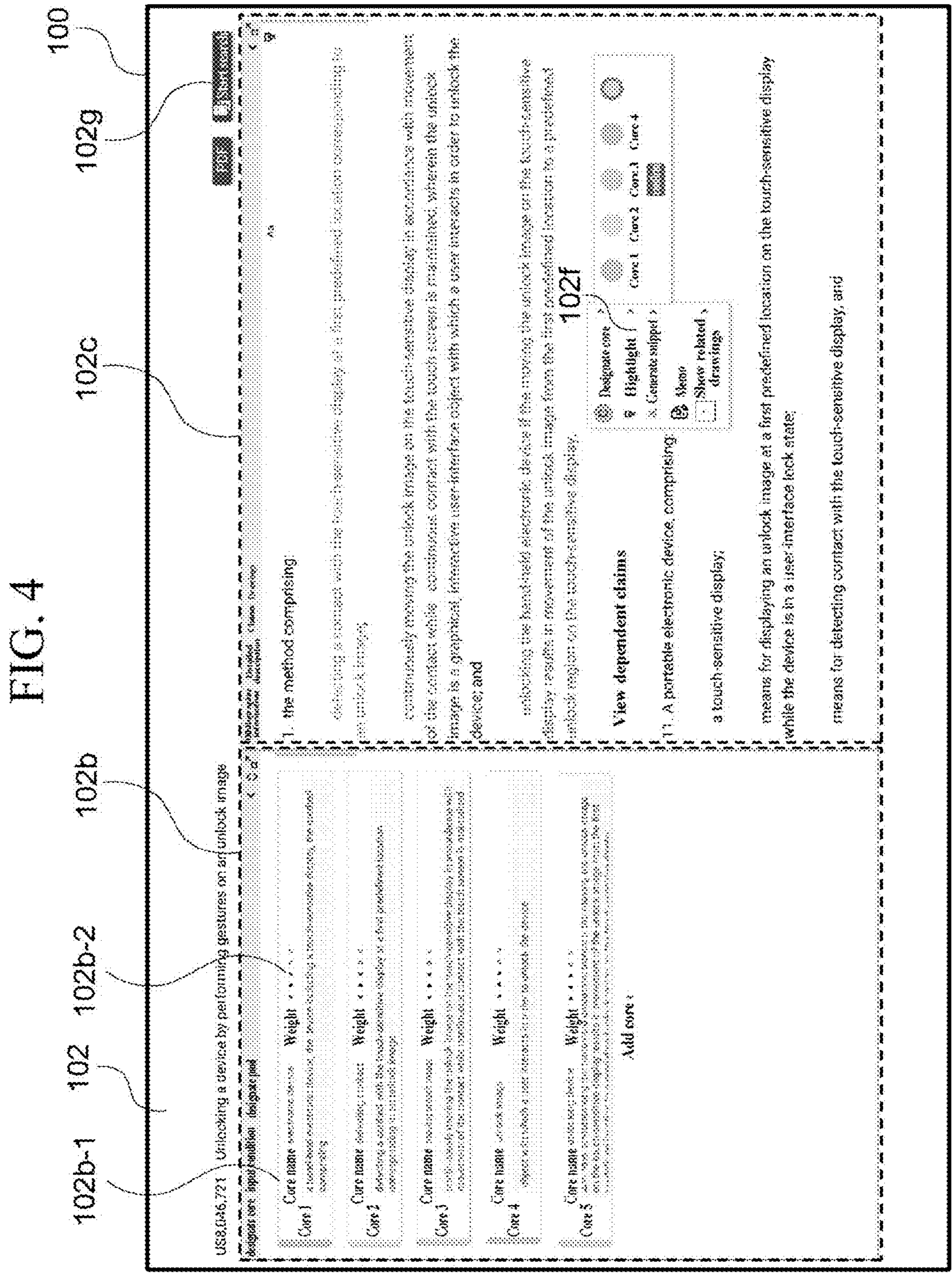

Referring to FIG. 4, the components selected by the user through the claim or detailed description may be designated as cores that define core keywords (words, phrases, or sentences) for search, and listed on the first panel 102*b* in the designated order.

In the present embodiment, keywords may be set as units of phrases or clauses composed of two or more words as well as words. Alternatively, the keywords may be set in sentences or paragraphs composed of sentences, and the number of times of appearance may be counted based on the set keywords.

In addition, the cores may also be designated by dynamically classifying claims into components according to a predetermined algorithm within the server. For example, the components of the claims may be divided based on a semicolon (;) to be set as the cores. Alternatively, the neural network model can automatically designate cores by dividing the components of the claims into each semantic unit through the trained neural network model based on the trained natural language processing.

In this case, the user may provide an element 102*b*-1 that provides summarized information for each core and a button element 102*b*-2 that may set weights indicating importance when searching for similar patents.

In the present embodiment, the core may have a designated color to be distinguished from other cores, and the user may provide a menu element 102*f* that may select colors for the contents of the core provided in the second panel 102*c*.

Next, the server 300 may provide similar patent document information by displaying paragraphs containing words, phrases, or sentences in a patent document determined to be similar in the color of the corresponding core (S40).

Hereinafter, the operation of the server extracting similar patent documents through mutual interaction with the user will be described with reference to FIG. 5.

Figure 5:
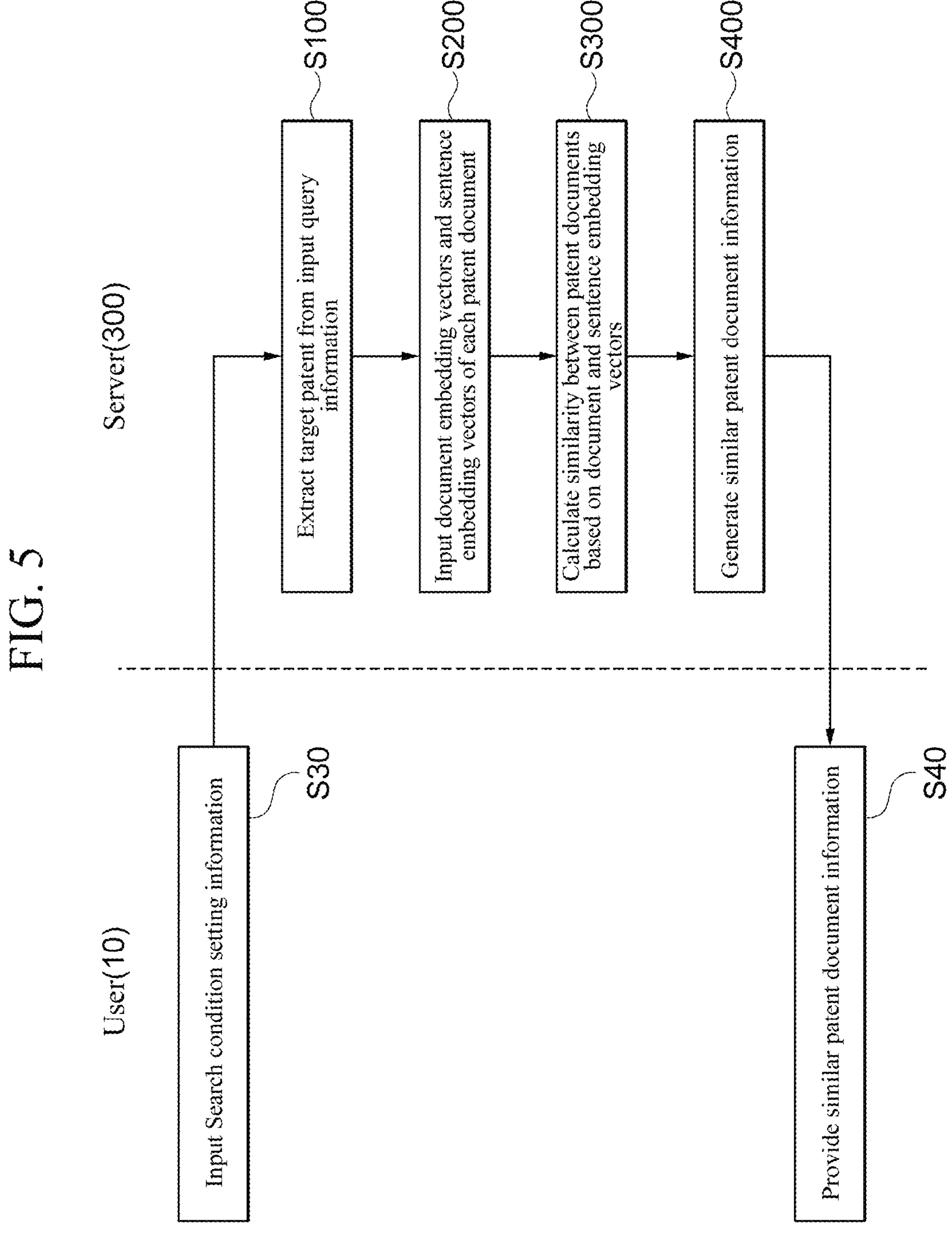
FIG. 5 is a flowchart illustrating a method for providing patent document analysis results through an interface according to an embodiment of the present disclosure.

Referring to FIG. 5, the server 300 may extract the target patent document information from the query information and the search condition setting information input by the user through the GUI 102 as described above (S100).

As the identification value of the target patent document in the query information, for example, an application (or publication or registration) number of the target patent or the title of invention is used to extract the target patent document from a patent document DB, and the extracted target patent document information is provided again to the user so that additional search condition setting information such as a keyword (word, phrase, or sentence) for search and a threshold number of times of appearance, a threshold similarity, or a weight for the keyword may be input.

As described above, the search condition setting information may include display information such as a color for displaying the core set by the user or provided by the server from the patent claims and a paragraph similar to the core.

In addition, as a condition for searching for prior patents, date information may be included as a priority date (application date) of the target patent, so the server 300 may set search conditions to search for patents prior to that date.

In addition, a patent classification system indicating a technical field of the invention, such as International Patent Classification (IPC) and Cooperative Patent Classification (CPC), may be input as the search conditions, and prior patent documents for the conditions may be searched or compared with preferentially.

Therefore, the server 300 extracts prior patent documents that will calculate the similarity to the target patent document using the input query information and search condition setting information.

Next, the server 300 receives document and sentence embedding vectors of each of the both extracted patent documents from an embedding vector DB (S200).

In the present embodiment, the document embedding vector is a value that embeds the meaning of the entire patent document and may have a unique value for each document, and the sentence embedding vector is a vector that embeds the meaning for each unit by using each sentence or paragraph or the like in the patent document as units, and may be generated as multiple values depending on the size or composition of the patent document.

The server 300 calculates the global similarity through the document embedding vector of the target patent document and the document embedding vectors of the prior patent documents, and at the same time calculates a sentence-level similarity by comparing the similarity between the elements of each patent document through the sentence embedding vector.

Figure 6:
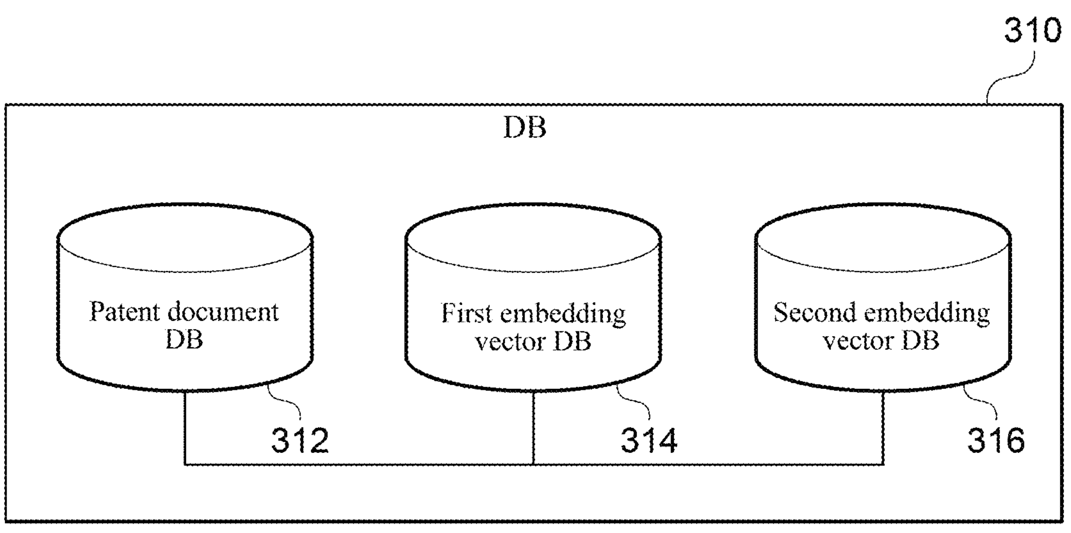
FIG. 6 is a block diagram illustrating a configuration of a database of a server according to an embodiment of the present disclosure.

Referring to FIG. 6, the server 300 may be configured to include a patent document DB 312 for extracting prior patent documents, a first embedding vector DB 314 for managing the first embedding vectors in the document unit by patent, and a second embedding vector DB 316 for managing the second embedding vectors in the sentence unit by patent.

The database according to the present embodiment may include the patent document DB 312, the first embedding vector DB 314, and the second embedding vector DB 316, and a database 310 may manage values in each DB corresponding to the identification information of the patent each DB as a unique index, and thus extract each value corresponding to the identification information of the patent in the input query information and use the extracted values for similarity assessment.

The identification information of the prior patent documents to be compared with the target patent document may also be extracted from the patent document DB 312 according to the search condition in the query information, the first embedding vector of the prior patent documents may be extracted from the first embedding vector DB 314 using the patent application (or publication or registration) numbers of prior patents as the identification information of the prior patent documents, or the second embedding vector may be extracted from the second embedding vector DB 316.

The embedding vectors may be generated in advance through the embedding model as described above and managed in the DB. Alternatively, it is possible to extract embedding vectors in the sentence unit as separate embedding models based on the core information set by the user in real time.

Next, the server 300 calculates the similarity between the patent documents based on the extracted first and second embedding vectors (S300).

The similarity assessment model according to the present embodiment can also implement a model network that sequentially determines the similarity using the hierarchically extracted embedding vectors for the document-sentence structure as described above, and calculate the similarity.

A second candidate patent list may be extracted as a set of the prior patent documents having a similarity greater than or equal to a threshold value through the first similarity between the prior patent document and the target patent document in the first candidate patent document list extracted from patent document DB 312 according to the search condition in the query information, and then in order to calculate the sentence-level similarity between the query document and the prior patent documents in the second candidate patent list, the second embedding vector for the corresponding patent may be extracted from the second embedding vector DB 316.

The second similarity may be calculated based on the second embedding vector set composed of the second embedding vector pairs between the target patent document and the prior patents in the second candidate patent list, and the similar patent document information in the second candidate patent document list may be generated as a patent list through the calculated second similarity (S400).

In this case, in the present embodiment, the similar patent document information may also include mapping information that is the basis of the similarity assessment in addition to the identification value of the similar patent document. The mapping information is information about sentences of the similar patent document that are similar to sentences of the target patent document, and may be generated for each core based on, for example, the text of the prior patent document that is most similar to a first core or a second core of the target patent document.

Specifically, the mapping information may include text having a similarity to the first core greater than or equal to a threshold value among the texts of the similar prior patent document and determination information on the location and similarity thereof, and the mapping information may be provided to the GUI together with the calculated similarity assessment results.

In addition, the threshold value for extracting the text of the prior patent document may be set for each core, and for example, the threshold value of the second core may be set to a value smaller than the threshold value set for the first core. Based on this, texts having a similarity greater than or equal to the second threshold value may be extracted from the prior patent document.

In addition, the threshold value for extracting the text of the prior patent document may be set for each core, and for example, the threshold value of the second core may be set to a value greater than the threshold value set for the first core. Based on this, texts having a similarity greater than or equal to the second threshold value may be extracted from the prior patent document.

The similar patent document information generated through the above process is provided to the user through the user terminal 100 (S40).

Hereinafter, the method for providing the similar patent document information generated according to the present embodiment through the GUI 102 of the user terminal 100 will be described with reference to FIGS. 7 and 8.

Figure 7:
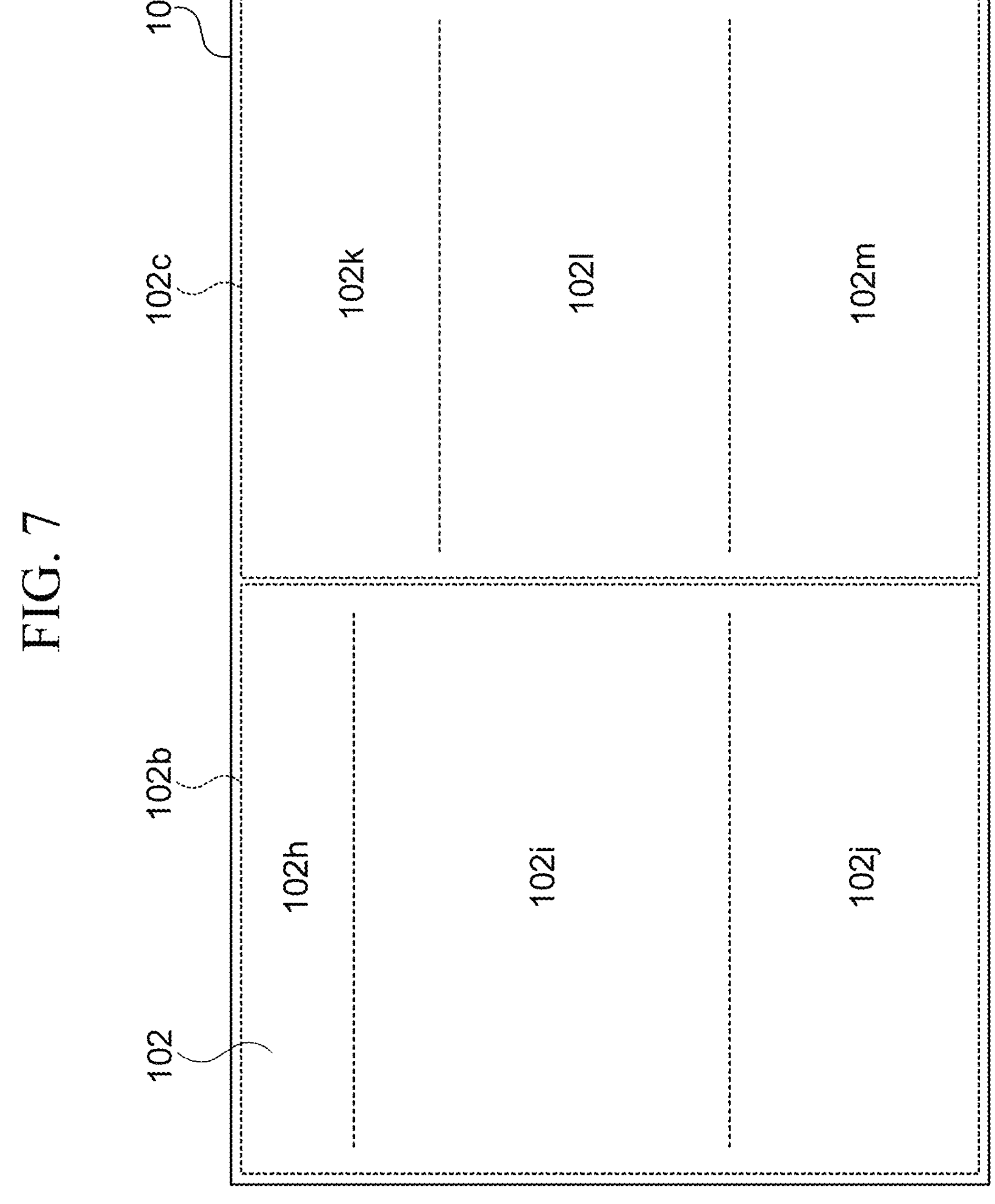

Referring to FIG. 7, the similar patent document information provided by server 300 according to the present embodiment may be provided through the GUI 102 divided into the first panel **102*b* and the second panel 102*c*** described above.

Specifically, each panel may be implemented in the form of a matrix to classify each document into rows, and divide cores of target patent documents and mapping information corresponding to the cores into columns and provide the cores and information.

Figure 8:
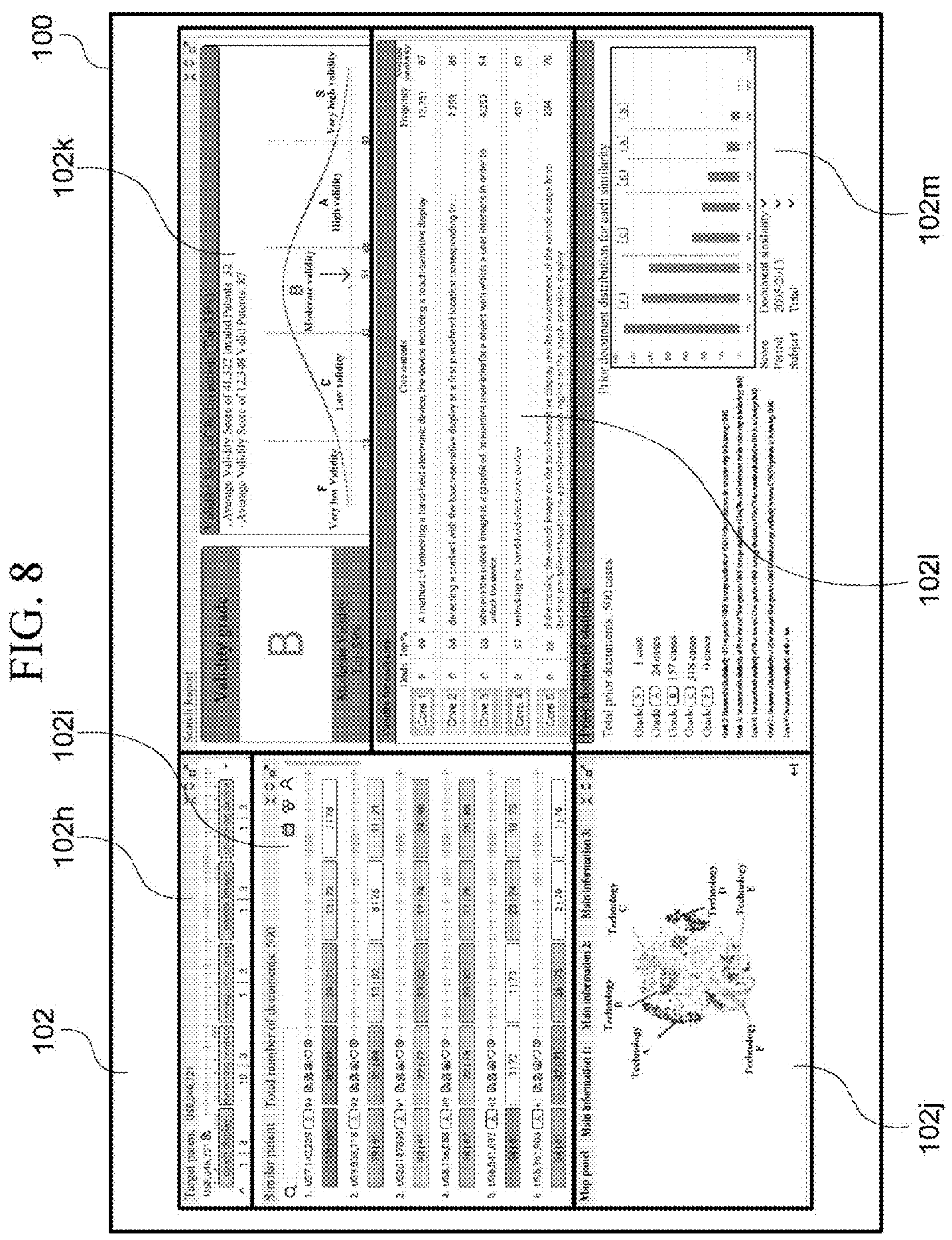

Referring to FIG. 8, the first panel **102*b* may provide summary information between the target patent document and the extracted similar patent documents, and the second panel 102*c*** may statistically provide the similarity assessment results.

In this case, the first panel **102*b* may be composed of three sub-panels: a 1-1th panel 102*h* that provides summary information of target patent document information, a 1-2th panel 102*i* that provides summary information of similar patent documents, and a 1-3th panel 102*j*** that provides mapping information within a feature space of similar patent documents.

In addition, the second panel **102*c* may be composed of three sub-panels: a 2-1th panel 102*k* that provides statistical information on the similarity assessment results, a 2-2th panel 102*l* that summarizes and provides the similarity assessment results by core, and a 2-3th panel 102*m*** that provides statistical information on all prior patents in the relevant technical field of the target patent.

Hereinafter, interface elements included in each panel according to the present embodiment will be described in more detail with reference to FIGS. 9 to 14.

In this embodiment, in the case of the 1-1th panel **102*h***, the target patent may be summarized as the target patent document and the information on search conditions, etc., may be visualized and be provided.

Referring to FIG. 9, the summary information of the target patent may include an element **102*h*-6 that ranks a document number and invalidity determination results of the target patent, a core 102*h*-1 input as search condition setting information, and a step-by-step color element 102*h*-4** that indicates the weight indicating the importance of the core.

In addition, the threshold number of times of appearance **102*h*-2 of the paragraph (sentence) corresponding to the core and threshold similarity information 102*h*-3** may be summarized and displayed as threshold information for similar patent extraction set by the user for each core. In other words, the set threshold information for similar patent extraction acts as a filter for extracting text, but the threshold similarity information may be determined based on the average or maximum similarity.

In addition, by providing to the GUI an element **102*h*-5** which scales the location information of paragraphs similar to each core in the target patent with a horizontal-shaped slider based on the size of the entire target patent, the user may intuitively determine the location and the number of times of appearance of cores in the target patent and recognize the importance.

Next, the 1-2th panel **102*i* provides the user with the summary information in the same format for the extracted similar patents, thereby enabling intuitive recognition. The 1-2th panel 102*i* displays a list of similar patents. The lists of similar patents may display similar patents sorted based on their similarity to the target patent and information on their similarity (e.g., a similarity grade indicated in alphabet, a similarity score, an interface element 102*i*-4**). The similarity may be a value inferred through a similarity assessment model provided in the server.

Figure 10:
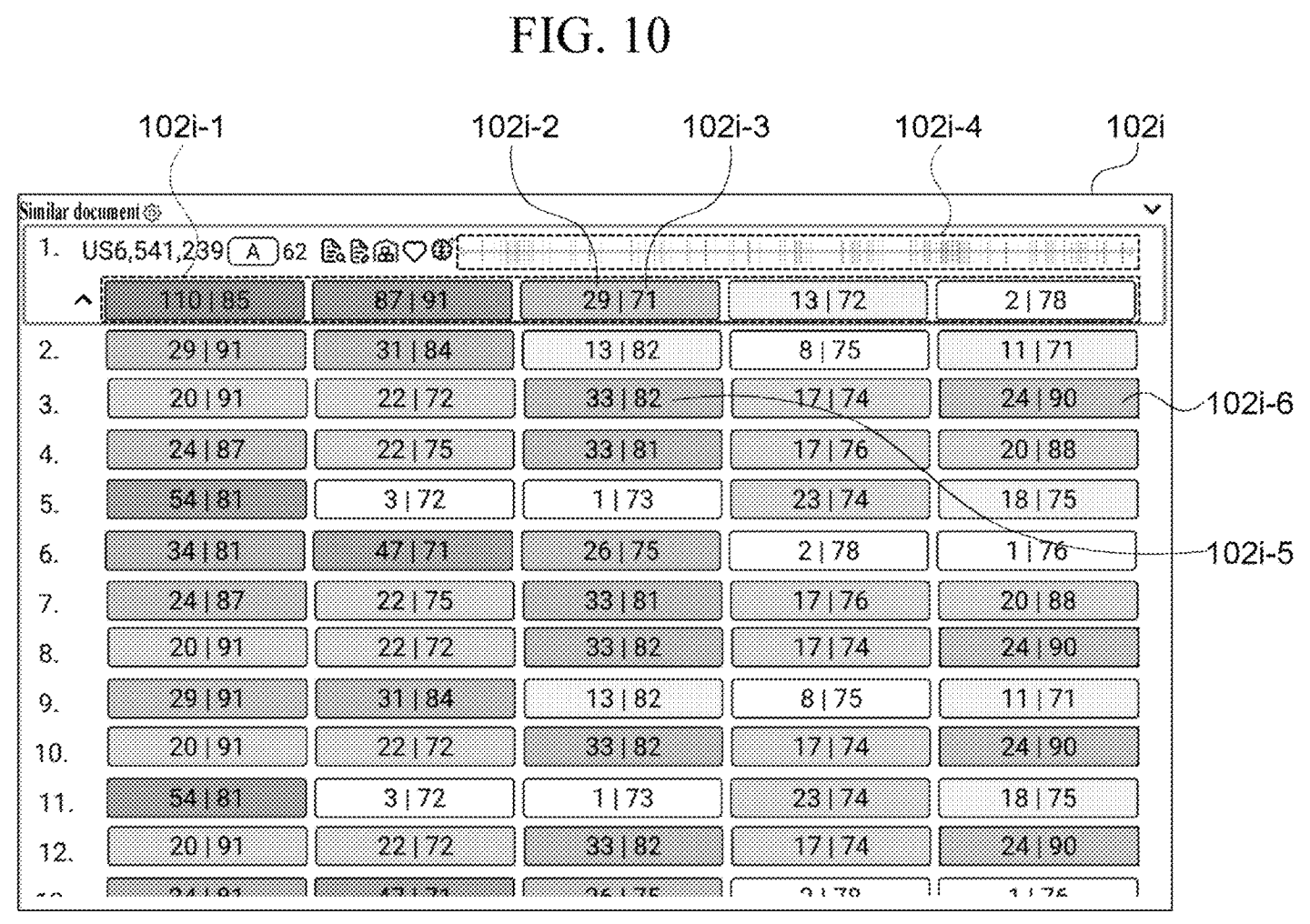

Referring to FIG. 10, for U.S. Pat. No. 6,541,239 extracted as a similar patent document as an example, the 1-2th panel **102*i* may scale a similarity score of 62, a grade A, and locations of paragraphs corresponding to cores of the target patent by color together with a document number and provide the scaled similarity score, grade A, and locations to the interface element 102*i*-4** in the form of a landscape.

In addition, as the similarity assessment results for each core, the number of times of appearance and similarity of paragraphs (sentences) corresponding to the core are provided as elements **102*i*-1** distinguished in the core unit.

For example, in the U.S. Pat. No. 6,541,239 extracted as the similar patent document, the number of texts in the similar patent document having a similarity greater than or equal to a threshold value corresponding to a third core of the target patent document is 29, and the average similarity calculated through this is calculated as 71, which may be represented as each element **102*i*-2 and 3**. Alternatively, it is also possible to display the maximum similarity value of the most similar text for each core instead of the average similarity.

Furthermore, the similarity for each core is provided in a step-by-step color, so the user may determine which core each similar patent document is intensively related to. In this case, in the present embodiment, the color may be determined using any one of the number, average similarity, or maximum similarity.

For example, in the case of similar patent document 3, only the similarity assessment results for each core are summarized and provided, and since a paragraph similar to a third core of the target patent document appears 33 times and a similarity is 82 and a similar paragraph related to a fifth core appears 24 times and a similarity is 90, result elements **102*i*-5 and 102*i*-6** for the third and fifth cores may be displayed in a darker color than the result elements of the other cores.

Figure 11:
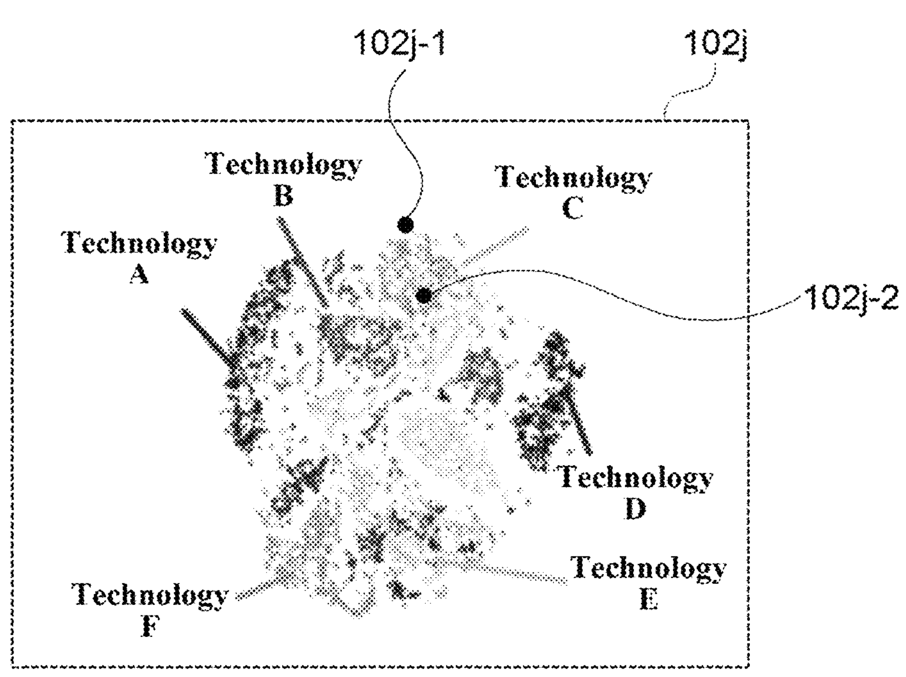

Next, describing the 1-3th panel **102*j* with reference to FIG. 11, the 1-3th panel 102*j* may map the embedding results of the target patent document and similar patent documents to a vector space and display the mapped results. Therefore, the user 10** may intuitively recognize that based on the positional relationship between the respective patent documents in the feature space based only on the mapping results, the closer the distance, the higher the relevance, and conversely, the farther the distance, the lower the relevance of the patents.

The mapping result in the feature space is displayed by classifying the mapping of all the patents in the patent document DB and the clusters by technology classification in color, thereby indirectly recognizing the relevance through the technology classification of the similar patent documents.

Furthermore, in the present embodiment, since the similarity is calculated through the embedding vector of the patent document, a distance in a feature space of embedding vectors **102*j*-1 and 102*j*-2** between the two documents may be used as a basis for explaining the corresponding similarity.

Therefore, instead of setting the threshold similarity in the process of setting the search conditions described above, the user can also set the threshold distance in the feature space as an additional search condition.

Next, describing the second panel **102*c*, the 2-1th panel 102*k* in the second panel 102*c*** may statistically provide the validity determination result of the target patent document through the valid patent document.

Figure 12:
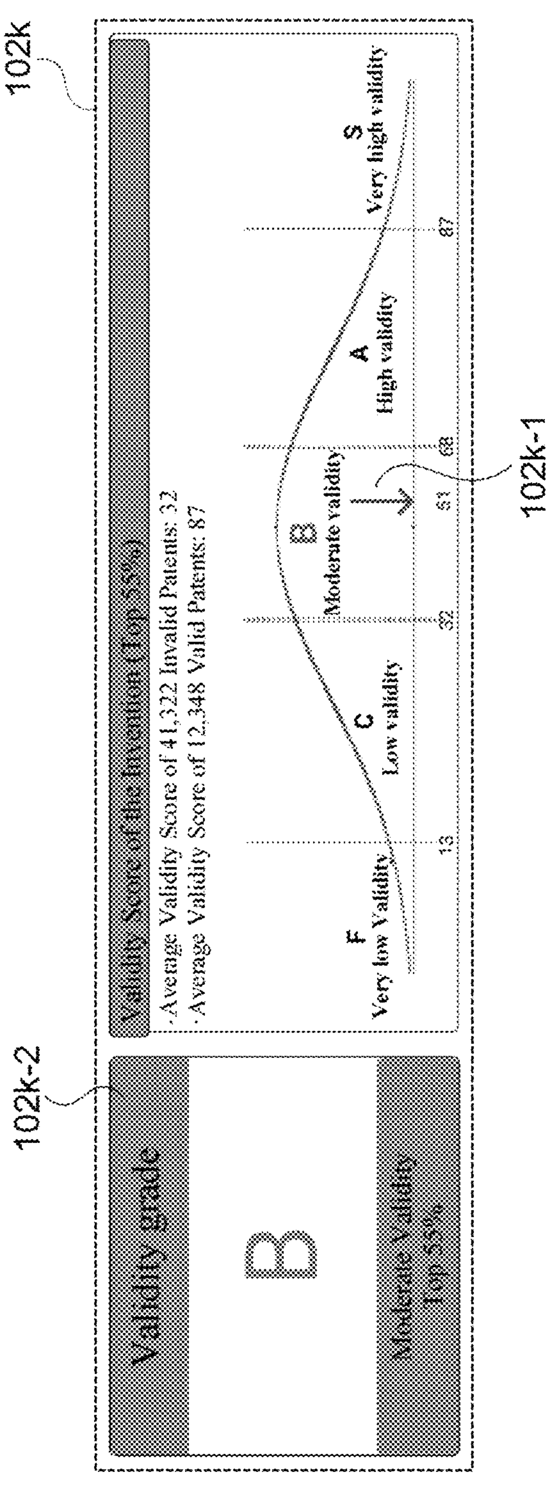

Specifically, referring to FIG. 12, the 2-1th panel **102*k*** may display the reference values set based on the statistical values (e.g., the average value of the validity scores) of the validity scores of patent documents that are determined to be valid/invalid as a result of patent examination, invalidity trial, or litigation in the patent document DB and the grade ranges defined by the reference values.

For example, the validity score may be calculated using the list of similar patents. For example, the validity score may be calculated by normalizing the sum of similarities of the similar patents listed in the list of similar patents.

The server 300 may provide a location in a distribution graph as one element **102*k*-1** so that a range to which the validity score of the target patent belongs may be determined based on a first average validity score of the validity scores of applications that have never been rejected as valid patent documents or patents that have never been invalidated and a second average validity score of the validity scores of applications that have been rejected as invalid patents or invalidated patents.

For example, when the average validity score of 41, 322 invalid patents is 32 and the average validity score of 12, 348 valid patents is 87, it is possible to provide the results as a range with 32 scores or less as a low validity range, a high validity range, and a range therebetween as a moderate validity range. However, the present disclosure is not limited thereto, and more grade ranges may be defined using 32 and 87 scores, as illustrated in **102*k*. In addition, it is possible to subdivide the ranges using the average of the upper/lower groups, and provide the analysis results through an element 102*k*-2**, which displays the range to which the calculated validity score belongs as a grade.

Referring to FIG. 13, the 2-2th panel **102*l* may statistically analyze and provide the similarity assessment results of the target patent for each core. That is, when the 2-1th panel 102*k* provides the validity grade of the patent, the 2-2th panel 102*l*** may provide the validity grades for each core and the locations and similarity scores within the entire distribution.

Specifically, the 2-2th panel **102*l* may include an element 102*l*-1 that provides, for each core, the number of times (frequency) of appearance of similar sentences (or words or phrases) having a value greater than or equal to a threshold similarity to the core in the similar patent document, the average similarity score, and the location/grade results within the distribution according to the validity score, and allows the user 10 to determine the contents of the core through an element 102*l*-2** that directly displays the contents of the core.

Therefore, the user 10 may determine that a specific core among the cores has low validity or recognize that additional analysis is needed for the core.

Figure 14A:
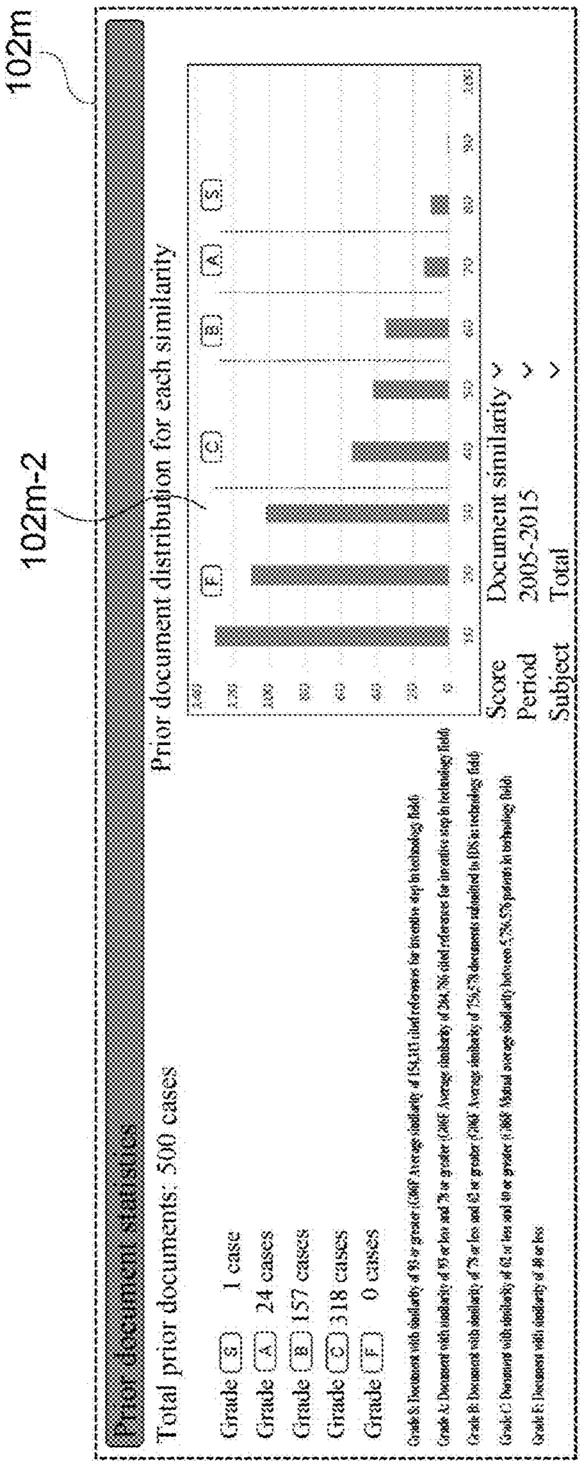

Referring to FIG. 14A, the 2-3 panel 102*m* may provide a statistical distribution of the entire list of prior patents extracted in the similarity assessment process.

As described above, in the present embodiment, the similarity assessment may extract similar patent documents by utilizing vectors embedded in stages according to the structure of the patent document, so the more global statistical result may be obtained through a set of prior patents that are primarily or secondarily filtered in this process.

In this case, the criteria for determining the grade may be determined according to the technology classification. For example, through the IPC code of the target patent, the similarity may be classified into 5 stages for all prior patents having the same IPC code, and the distribution of the prior patent lists according to the similarity score may be provided as one element 102*m*-2.

In this case, the reference value for classifying the stages may refer to the examiner's judgment results of prior patents with the same IPC code. For example, the S grade may be divided sequentially by the average of the similarity assessment results between the cited reference for novelty used as the cited reference for violation of novelty (Article 29, Paragraph 1 of the Korean Patent Act, Article 102 of the U.S. Patent Act) and the patent document under examination as a result of patent examination in the technical field of IPC code G06F.

In the case of IPC code G06F, when the average similarity score is 93 as the similarity assessment result of 154, 313 cases used as cited references for violation of novelty, prior patents with similarity to the target patent of the corresponding score or higher may be classified as S grade.

In the case of grade A, the average similarity between cited references for inventive step cited in the rejection reason for violation of inventive step (Article 29, Paragraph 2 of the Korean Patent Act, Article 103 of the US Patent Act) during the examination and the target patent to be examined may be used as a criterion for classification among the patents of the corresponding IPC classification.

For example, when the similarity average between examination target patents of 264,789 cases used as cited references for inventive steps among patents with the IPC code of GO6F is 78, prior patents with similarity to the target patent of 78 scores or higher may be classified as grade A.

Using the examination results, the similarity assessment results between patents in the patent document DB may be used as a grade classification criterion. However, in the case of grade B and below, the similarity assessment results were not directly cited in the examination results for patentability determination, but may be used as a criterion for classifying grades when they were used as references according to the applicant's submission, for example, the Information Disclosure Statement (IDS) system.

In addition, grade C may be used as a criterion by extracting the average of mutual similarity between specific document pairs within the technical classification, and the documents used for the criteria determination of the above-described grade B may be excluded.

Next, for the D grade, the average similarity between the target document and documents excluding the technical field of the target document may be used as a reference value.

Through the technical classification-specific grade distribution factor 102*m*-2, user 10 may determine the possibility of occurrence of a rejection reason for violation of novelty or inventive step or invalidity through the prior patents of the target patent document.

Figure 14B:
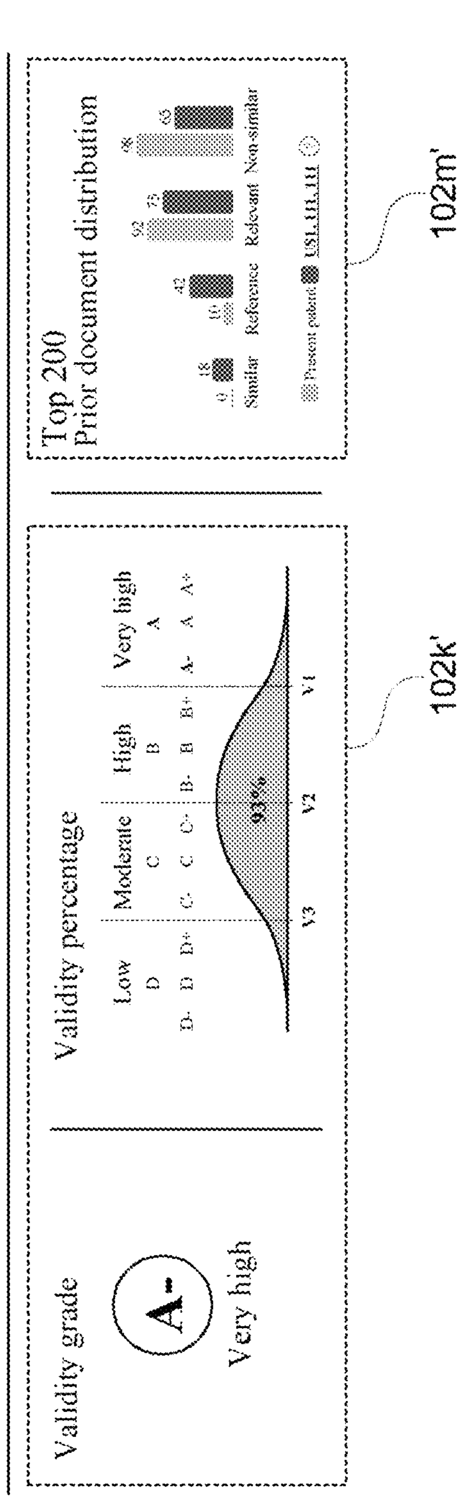

In addition, referring to FIG. 14B, the 2-3 panel described above may be implemented as a visual element 102*m'* by being provided by the comparison between the statistical distribution of the upper prior patent lists extracted in the similarity assessment process of the target document (this present) and the statistical distribution of the upper prior patent lists for a specific prior patent (e.g., U.S. Pat. No. 1,111,111).

Through this, the user may compare and recognize the distribution of similar prior documents of this patent and specific prior patents, and determine relative values, such as relative invalidity possibility and usability in related industries. In this case, the visual element 102*m'* illustrated in FIG. 14B may be implemented in a form that is provided to the user in parallel with a validity grade result element 102'*k* of the patent provided to the 2-1th panel 102*k* of FIG. 13 described above and provided to the user.

In addition, the panels in the GUI 102 according to the present embodiment may be adjusted in position or size according to the size of the display device of the user terminal or the user's request, and the interface elements in the panels may also react dynamically to change the displayed contents.

Figure 15:
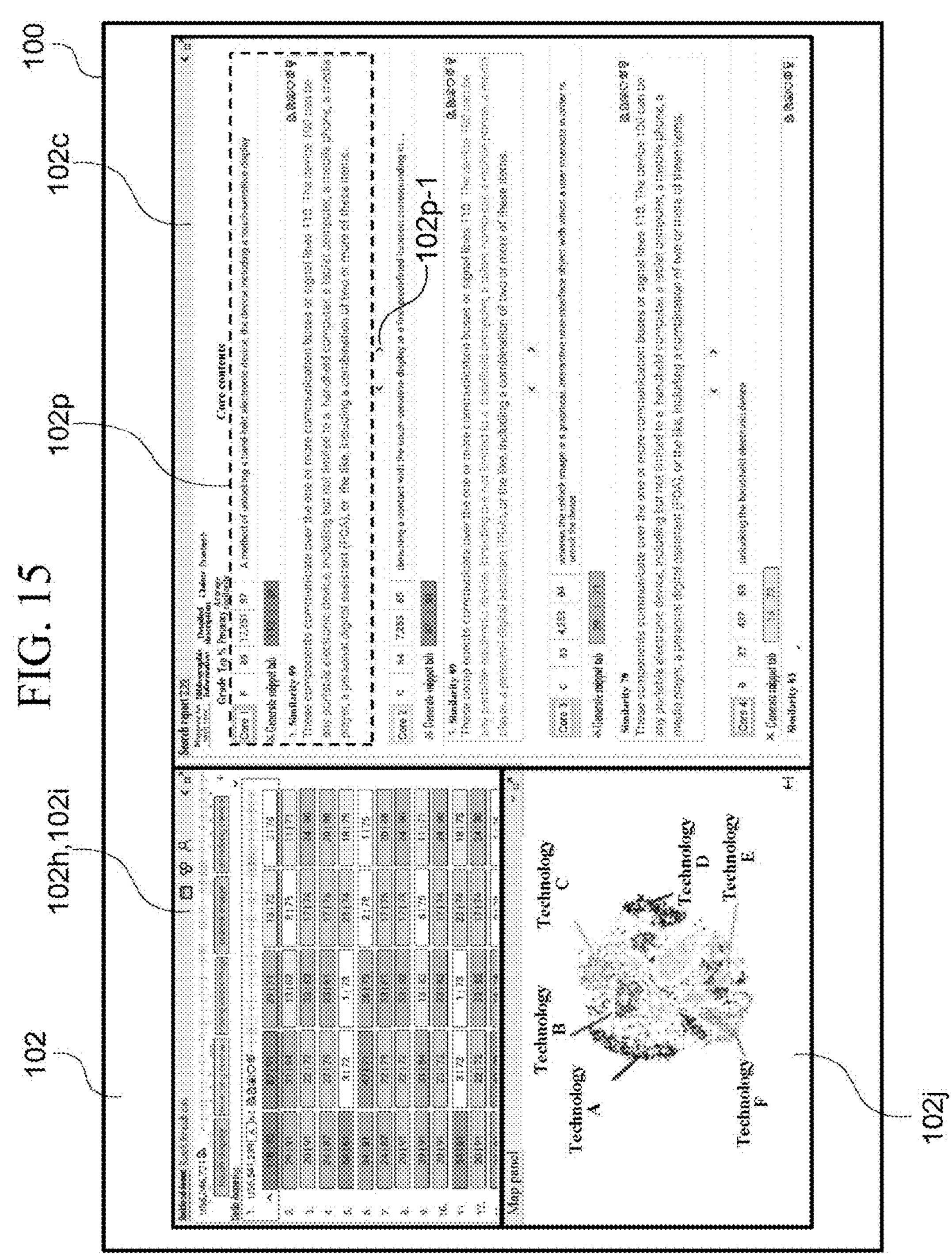

For example, referring to FIG. 15, according to the present embodiment, the second panel 102*c* may provide contents in an integrated area for a detailed view of a similar patent document selected from the first panels 102*h* and 102*i*. Accordingly, paragraphs including sentences having the highest similarity to each core of the target patent document may be distinguished and provided as each element 102*p* on the second panel as a detailed view of the U.S. Pat. No. 6,541,239 as the first similar patent document selected by the user. The user 10 may determine whether there is similarity by directly comparing the core of the target patent document with the extracted paragraphs of the similar patent document.

The element 102*p* may provide similarity grades for each core, along with the location and frequency in distribution and the average similarity, and for example, for core 1, 12, 351 sentences are extracted with a threshold similarity or higher, and thus, a menu button element 102*p*-1 that may additionally view the paragraphs may be provided.

In addition, in addition to comparing the target patent document with similar patent documents, in order to compare the similar patent documents, in the present embodiment, it is also possible to divide and provide the second panel 102*c* so that the contents of each similar patent document may be viewed together.

Figure 16:
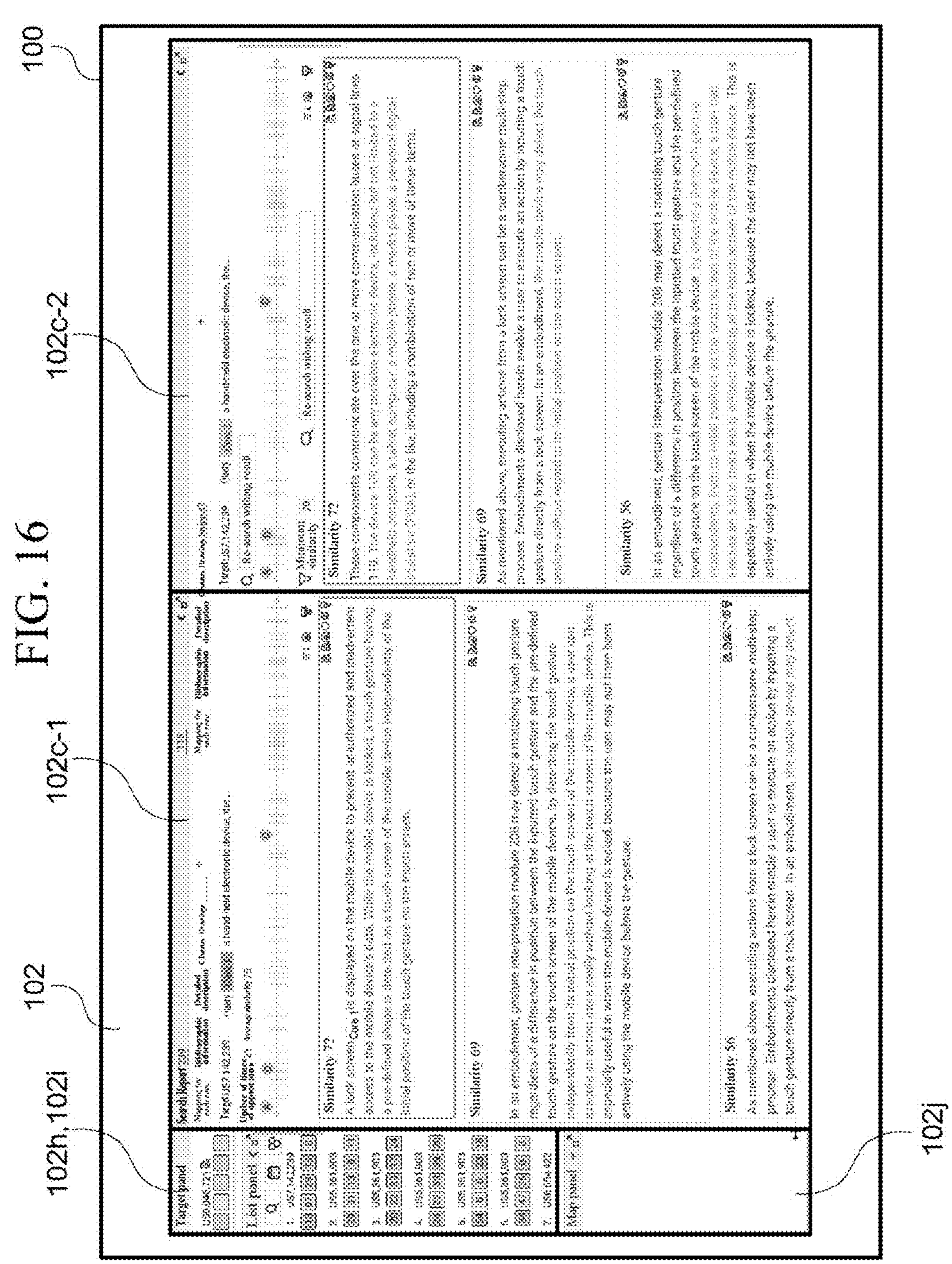

Referring to FIG. 16, the second panel may provide a list of paragraphs of two similar patent documents selected through horizontal divisions 102*c*-1 and 102*c*-2 according to the similarity. Accordingly, the user may simultaneously compare paragraphs of major similar patent documents for each core of the target patent and check the eligibility of cited references for violation of inventive step by determining whether the technical ideas of the paragraphs are common and can be combined.

In addition, the first panel 102*b* (102*h*, 102*i*) whose area is reduced due to the expansion of the second panel 102*c* may summarize and provide the dynamically displayed information. In the present embodiment, the 1-1th and 1-2th panels 102*h* and 102*i* may summarize and provide the similarity assessment results of the target patent document and the similar patent document, but provide the color of the core for identifying the core of the target patent document and the frequency of paragraphs corresponding to the color of the core of the similar patent document as minimum information, thereby allowing the user to select the similar patent document to be compared.

Hereinabove, a specific hardware implementation of the server 300 that performs the method for visualizing similarity assessment results according to an embodiment of the present disclosure will be described.

Figure 17:
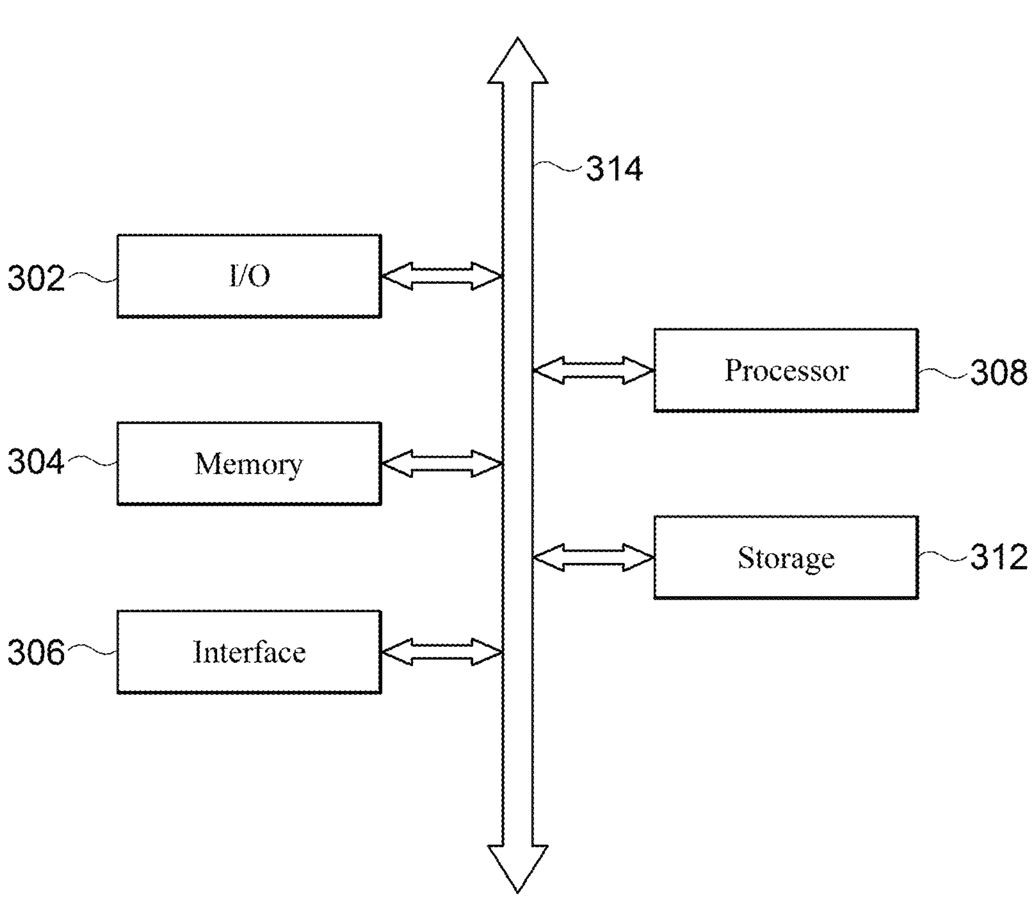
FIG. 17 is a block diagram illustrating a hardware configuration of a server that provides patent document analysis results according to an embodiment of the present disclosure.

Referring to FIG. 17, in some embodiments of the present disclosure, the server 300 may be implemented in the form of a computing device. One or more of each module constituting the server 300 is implemented on a general-purpose computing processor and thus may include a processor 308, an input/output (I/O) 302, a memory device 304, an interface 306, a storage 312, and a bus 314. The processor 308, the input/output (I/O) 302, the memory device 304, and/or the interface 306 may be coupled to each other via the bus 314. The bus 314 corresponds to a path through which data moves.

Specifically, the processor 308 may include at least one of a central processing unit (CPU), a micro processor unit (MPU), a micro controller unit ((MCU), a graphics processing unit (GPU), a microprocessor, a digital signal processor, a microcontroller, an application processor (AP), and logic devices capable of performing functions similar thereto.

The input/output (I/O) device 302 may include at least one of a keypad, a keyboard, a touchscreen, and a display device. The memory device 304 may store data and/or programs, etc.

The interface 306 may perform a function of transmitting data to or receiving data from a communication network. The interface 306 may be wired or wireless. For example, the interface 306 may include an antenna or a wired/wireless transceiver, etc. Although not illustrated, the memory device 304 may further include high-speed DRAM and/or SRAM as operation memory to enhance the operation of the processor 308.

The storage 312 therein stores programming and data configurations that provide the functions of some or all of the modules described herein. For example, it may include logic to perform selected aspects of the similarity assessment method described above.

The memory device 304 may load a program or application with a set of instructions that includes each step of performing the visualization method through the similarity assessment described above stored in the storage 312 and allow the processor to perform each step.

According to the present disclosure, by providing a menu capable of inputting the patent information to be analyzed to the user interface, it is possible for users to easily request the analysis of the patent document.

In addition, by inputting analysis conditions of patent information to be analyzed based on the graphical user interface, it is possible for users to intuitively request results that meet their needs.

According to the present disclosure, by providing the analysis results visualized according to the input user conditions, it is possible to easily and quickly understand the analysis results.

In addition, according to the present disclosure, by providing the analysis results using the trained neural network model, it is possible to faster provide the analysis results.

Furthermore, various exemplary embodiments described herein may be implemented in computer-readable recording medium using, for example, software, hardware, or a combination thereof.

According to a hardware implementation, embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for executing other functions. In some cases, embodiments described herein may be implemented as a control module itself.

According to a software implementation, embodiments such as procedures and functions described herein may be implemented as separate software modules. Each of the software modules may execute one or more functions and operations described herein. A software code may be implemented as a software application written in a suitable programming language. The software code may be stored in a memory module and executed by a control module.

The spirit of the present disclosure has been described only by way of example hereinabove, and the present disclosure may be variously modified, altered, and substituted by those skilled in the art to which the present disclosure pertains without departing from essential features of the present disclosure.

Accordingly, embodiments disclosed in the disclosure and the accompanying drawings are provided in order to describe the technical spirit of the disclosure rather than limiting the technical spirit of the disclosure, and the scope of the disclosure is not limited by these embodiments and the accompanying drawings. The scope of the disclosure should be interpreted by the following claims, and it should be interpreted that all spirits equivalent to the following claims fall within the scope of the disclosure.

The invention claimed is:

1. A method implemented by a computer, comprising:

receiving target patent information;

extracting a first embedding vector of a target patent and first embedding vectors of prior patent documents from a first embedding vector database that stores document-level embedding vectors for each patent document;

calculating a first similarity between the first embedding vector of the target patent and the first embedding vectors of the prior patent documents, and extracting a candidate patent list comprising the prior patent documents having the first similarity greater than or equal to a threshold value;

extracting second embedding vectors of the target patent and the prior patent documents in the candidate patent list from a second embedding vector database that stores sentence-level embedding vectors for each patent document, and calculating a second similarity based on the second embedding vectors for each of cores of the target patent to generate similar patent document information; and displaying a user interface that includes a first panel which distinguishes cores defining at least one component information extracted from the input target patent according to a determined color, and a second panel which distinguishes similarity assessment results of the target patent with respect to the similar patent document information according to the determined color, wherein the target patent information comprises at least one sentence, wherein each of the cores corresponds to at least one received sentence of the target patent, the first panel being configured to visually distinguish the cores from one another, and wherein the similarity is calculated according to a predetermined criterion using result data from patent examinations or trials in which the validity of patents has been examined or determined, and the target patent is provided in the second panel with the calculated similarity.

2. The method of claim 1, wherein the first panel includes extraction criteria for each core for extracting the similar patents.

3. The method of claim 2, wherein the first panel includes weights of the similarity assessment with the similar patents.

4. The method of claim 2, wherein the second panel includes results according to the extraction criteria for each core for extracting the similar patents.

5. The method of claim 1, wherein the interface further includes a third panel that provides corresponding paragraph information for each core of the target patent or the similar patents.

6. The method of claim 1, wherein the interface further includes a third panel that provides a validity determination result according to a comparison for each core of the similar patents extracted from the target patent.

7. The method of claim 6, wherein the third panel provides a statistical validity score of the target patent.

8. The method of claim 7, wherein the third panel provides a distribution location of a validity score of a patent whose validity has been determined in the past or a validity score of a patent whose validity has been determined to be invalid, based on the validity score of the target patent.

9. The method of claim 1, wherein the interface includes a fourth panel that maps feature vectors of the target patent or the similar patents into a feature space and provides the feature vectors.

10. The method of claim 9, wherein a first feature vector of the target patent and a second feature vector of the similar patents have a distance in the feature space corresponding to a similarity calculated for the target patent and the similar patents.

11. A non-transitory computer-readable recording medium storing a program executable by a processor for performing a method implemented by a computer, the method comprising:

receiving target patent information;

extracting a first embedding vector of a target patent and first embedding vectors of prior patent documents from a first embedding vector database that stores document-level embedding vectors for each patent document;

calculating a first similarity between the first embedding vector of the target patent and the first embedding vectors of the prior patent documents, and extracting a candidate patent list comprising the prior patent documents having the first similarity greater than or equal to a threshold value;

extracting second embedding vectors of the target patent and the prior patent documents in the candidate patent list from a second embedding vector database that stores sentence-level embedding vectors for each patent document, and calculating a second similarity based on the second embedding vectors for each of cores of the target patent to generate similar patent document information; and displaying a user interface that includes a first panel which distinguishes cores defining at least one component information extracted from the input target patent according to a determined color, and a second panel which distinguishes similarity assessment results of the target patent with respect to the similar patent document information according to the determined color, wherein the target patent information comprises at least one sentence, wherein each of the cores corresponds to at least one received sentence of the target patent, the first panel being configured to visually distinguish the cores from one another, and wherein the similarity is calculated according to a predetermined criterion using result data from patent examinations or trials in which the validity of patents has been examined or determined, and the target patent is provided in the second panel with the calculated similarity.

12. A method for visualizing patent documents implemented by a computer, comprising:

displaying first and second cores of a target patent;

displaying a first similar document similar to the target patent based on a calculated similarity; and displaying 1-1th core mapping information and 1-2th core mapping information of the first similar document, wherein the 1-1th core mapping information is information generated based on a 1-1th text similar to the first core among texts of the first similar document, and the 1-2th core mapping information is generated based on a 1-2th text similar to the second core among the texts of the first similar document, wherein target patent information is received by the computer, a first embedding vector of the target patent and first embedding vectors of prior patent documents are extracted from a first embedding vector database that stores document-level embedding vectors for each patent document, a first similarity is calculated between the first embedding vector of the target patent and the first embedding vectors of the prior patent documents, and a candidate patent list, comprising the prior patent documents having the first similarity greater than or equal to a threshold value, is extracted, second embedding vectors of the target patent and the prior patent documents is extracted in the candidate patent list from a second embedding vector database that stores sentence-level embedding vectors for each patent document, and a second similarity is calculated based on the second embedding vectors for each of cores of the target patent to generate similar patent document information, and a user interface, that includes a first panel which distinguishes cores defining at least one component information extracted from the input target patent according to a determined color, and a second panel which distinguishes similarity assessment results of the target patent with respect to the similar patent document information according to the determined color, is displayed, wherein the target patent information comprises at least one sentence, wherein each of the cores corresponds to at least one received sentence of the target patent, and the cores are visually distinguished from one another, and wherein the similarity is calculated according to a predetermined criterion using result data from patent examinations or trials in which the validity of patents has been examined or determined, and the target patent is provided in the second panel with the calculated similarity.

13. The method of claim 12, wherein the 1-1th text has a similarity to the first core among the texts of the first similar document that is greater than or equal to a first threshold value.

14. The method of claim 12, wherein the 1-2th text has a similarity to the second core among the texts of the first similar document that is greater than or equal to a second threshold value smaller than the first threshold value.

15. The method of claim 12, further comprising:

displaying a third core of the target patent; and displaying 1-3th core mapping information of the first similar document, wherein the 1-3th core mapping information is information generated based on a 1-3th text similar to the third core among the texts of the first similar document.

16. The method of claim 12, wherein the 1-1th core mapping information is displayed at a first position corresponding to the first core, and the 1-2th core mapping information is displayed at a second position corresponding to the second core.

17. The method of claim 16, wherein the first and second cores and the 1-1th and 1-2th core mapping information are arranged in a matrix form, the first and second cores are arranged in a first row, and the 1-1th and 1-2th core mapping information is arranged in a second row.

18. The method of claim 12, wherein the first text is provided in plurality, and the 1-1th core mapping information includes at least one of the number of the plurality of first texts, an average similarity of the 1-1th texts to the first core, and a similarity of the 1-1th text most similar to the first core among the plurality of 1-1th texts.

19. The method of claim 18, wherein a color of the 1-1th core mapping information is determined based on at least one of the number of the plurality of first texts, the average similarity of the 1-1th texts to the first core, and a maximum similarity of the 1-1th text most similar to the first core among the plurality of 1-1th texts.

20. The method of claim 12, further comprising:

displaying a second similar document similar to the target patent; and displaying 2-1th core mapping information and 2-2th core mapping information of the second similar document, wherein the 2-1th core mapping information is information generated based on a 2-1th text similar to the second core among texts of the second similar document, and the 2-2th core mapping information is information generated based on a 2-2th text similar to the second core among the texts of the second similar document.

* * * * *